(12) United States Patent
Ramakrishan et al.

(10) Patent No.: US 8,101,680 B1
(45) Date of Patent: Jan. 24, 2012

(54) METHODS OF PREPARING POLYMER NANOCOMPOSITES

(75) Inventors: Vaidyanath Ramakrishan, Bangalore (IN); Parnasree Maiti, Bangalore (IN); Sonia Oberoi, Woodbridge, NJ (US); Soumyadeb Ghosh, Bangalore (IN); Theodorus Lambertus Hoeks, Bergen op Zoom (NL); Ning Hao, Beijing (CN); Hans Looij, Bergen op Zoom (NL)

(73) Assignee: Sabic Innovative Plastics IP B.V., Bergen Op Zoom (NL)

( * ) Notice: Subject to any disclaimer, the term of this patent is extended or adjusted under 35 U.S.C. 154(b) by 0 days.

(21) Appl. No.: 12/902,574

(22) Filed: Oct. 12, 2010

(51) Int. Cl.
*C08K 3/22* (2006.01)
(52) U.S. Cl. ........ 524/431; 524/403; 524/413; 524/430; 524/432; 524/439; 524/440
(58) Field of Classification Search .................. 524/403, 524/413, 430, 431, 432, 439, 440
See application file for complete search history.

(56) References Cited

U.S. PATENT DOCUMENTS

| | | | |
|---|---|---|---|
| 2007/0117900 A1* | 5/2007 | Lee | 524/431 |
| 2008/0081865 A1 | 4/2008 | Biswas et al. | |
| 2008/0167414 A1 | 7/2008 | Biswas et al. | |
| 2009/0004099 A1 | 1/2009 | Iversen et al. | |
| 2010/0280176 A1 | 11/2010 | Biswas et al. | |
| 2011/0151255 A1* | 6/2011 | Kim et al. | 428/372 |

FOREIGN PATENT DOCUMENTS

| | | |
|---|---|---|
| EP | 1716947 A1 | 11/2006 |
| WO | WO 02/087749 A1 | 11/2002 |
| WO | WO 02/096982 A1 | 12/2002 |
| WO | WO 03/045448 A1 | 6/2003 |
| WO | WO 2004/017341 A1 | 2/2004 |
| WO | WO 2005/013897 A2 | 2/2005 |
| WO | WO 2005/013897 A3 | 2/2005 |
| WO | WO 2008/042496 A1 | 4/2008 |
| WO | WO 2008/091413 A2 | 7/2008 |
| WO | WO 2008/091413 A3 | 7/2008 |

OTHER PUBLICATIONS

Rakhimov et al., "Mechanochemical Synthesis of Co, Ni, Fe Nanoparticles in Polymer Matrices," Summary—Amer Inst Physics, Journal of Applied Physics; pp. 7133-7135; vol. 95 (1 pg).

Xia et al., "Preparation, structure and thermal stability of Cu/LDPE nanocomposites," Materials Chemistry and Physics 95 (2006) pp. 122-129.

Kotlyar et al., "Coating Silver Nanoparticles on Poly(methyl methacrylate) Chips and Spheres via Ultrasound Irradiation," Journal of Applied Polymer Science, vol. 104, (2007) pp. 2868-2876.

* cited by examiner

*Primary Examiner* — Peter Szekely
(74) *Attorney, Agent, or Firm* — Fay Sharpe LLP; Richard M. Klein

(57) ABSTRACT

Methods of forming nanocomposites comprising a polymer and metal nanoparticles are disclosed. The nanoparticles are disposed within a matrix of the polymer. In particular, the nanoparticles are formed in situ in an extruder. The methods comprise providing a reaction mixture comprising a polymer, a metal precursor, and a solvent and extruding the reaction mixture to form a polymer nanocomposite. The methods overcome nanoparticle dispersion issues arising from melt blending processes.

18 Claims, 8 Drawing Sheets

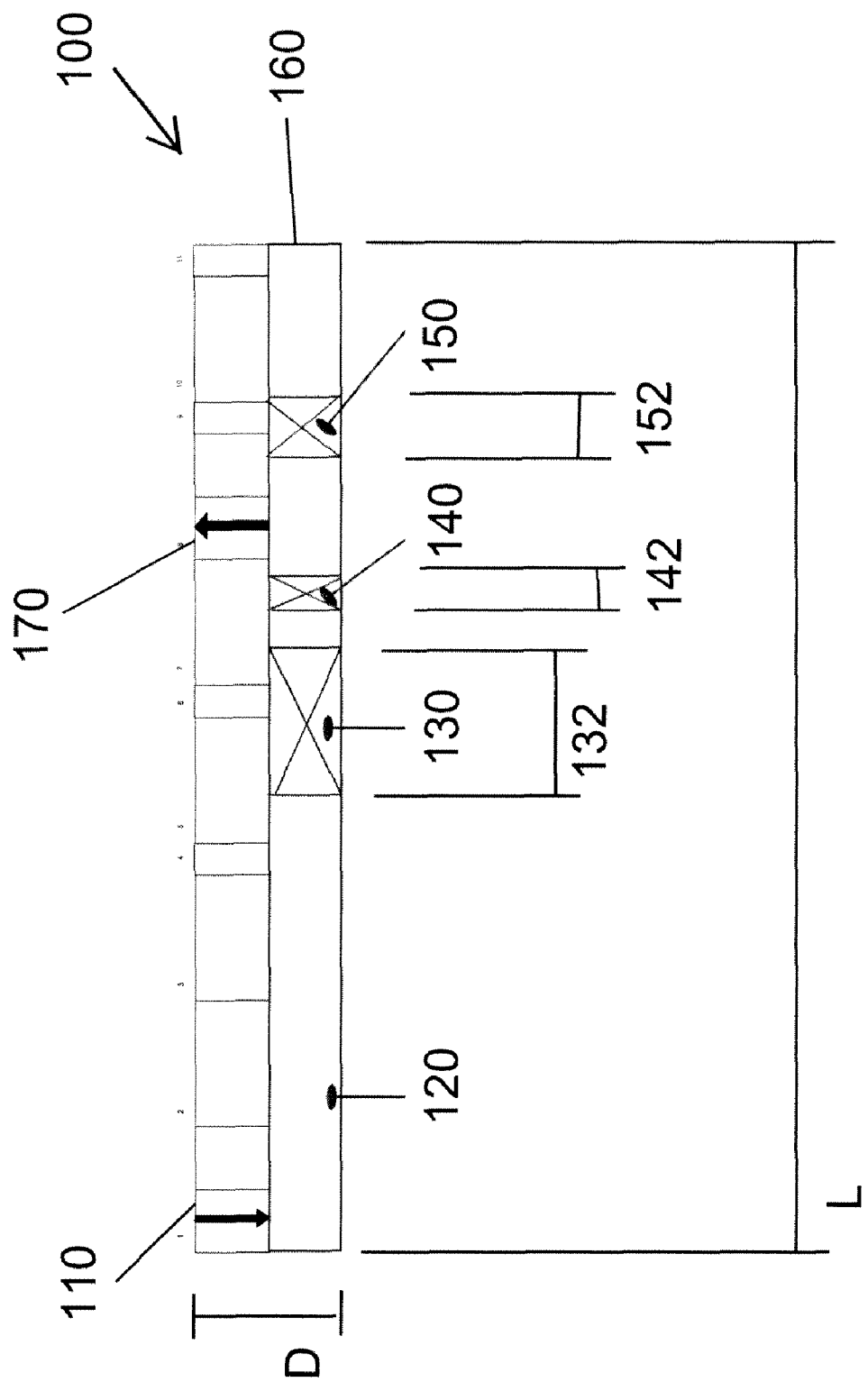

METHODS OF PREPARING POLYMER NANOCOMPOSITES

BACKGROUND

The present disclosure relates, in various exemplary embodiments, to polymer nanocomposites prepared by forming metal nanoparticles in-situ in a polymer melt in an extruder. Methods for making the nanoparticles, as well as articles formed therefrom, are also disclosed.

Nanocomposites are particle-filled polymers for which at least one of the dimensions of the dispersed particles is in the nanometer ($10^{-9}$ meter) or nanoscale range (typically from about 1 to about 200 nanometers). Nanocomposites often have superior physical and mechanical properties over their microcomposite counterparts, such as improved modulus, reduced gas permeability, flame retardance, and improved scratch resistance. Moreover, the nanoscale dispersion of the particles within the polymer frequently does not produce the brittleness and opacity typically found in microcomposites or larger sized particles.

Nanocomposites may be made from ex-situ melt blending processes. However, in conventional melt blending processes, relatively uniform dispersion of nanoparticles within the polymer, such as a polycarbonate matrix, is difficult to achieve. Typically, the nanoparticles remain largely localized in the form of agglomerates in the polymer matrix.

Additionally, some nanoparticle generation processes require intermediate temperature or time conditions for optimum sized particles. However, melt blending can be incompatible with such processes.

Nanoparticles may also be generated from metal salt solutions. Unfortunately, conventional melt blending processes can restrict the volume of solvent which can be added, thus restricting nanoparticle formation. Commercial scale solvent usage and disposal can also present serious hazards, and stripping of the solvent during the blending process increases the likelihood of particle agglomeration or oxidation to an undesired state.

When metal or metal oxide particles are added as external additives to polymers via melt or solution blending, their particle size and shape cannot be controlled. The particles also tend to agglomerate together.

Sometimes, higher levels of nanoparticles can be added to the polymer matrix to increase a desired property. However, this use of higher levels may also increase the desired property to the detriment of other properties. For example, higher levels can result in a nanocomposite having inferior optical properties, such as reduced transparency or increased haze.

There remains a need for nanocomposites, and methods for producing the same, that overcome dispersion issues arising from conventional melt blending processes.

BRIEF DESCRIPTION

Disclosed in various embodiments are polymer nanocomposites and methods for making and using them. Nanoparticles are formed in-situ in the nanocomposite during melt extrusion. It is believed that thermal energy and shear produced during the melt extrusion process lead to excellent dispersion of the metal and/or metal oxide nanoparticles. This overcomes dispersion issues arising from conventional melt blending processes. In addition, the methods allow for controlling the size and shape of the nanoparticles and produce nanocomposites with special properties, i.e. infrared (IR) reflectance, anti-microbial, etc. Enhanced retention of transparency can be obtained in polymer nanocomposites produced in accordance with the methods of the present disclosure.

Disclosed in embodiments is a method for producing a dispersion containing a polymer and nanoparticles. A solution comprising a metal precursor and a solvent is provided. The metal precursor is not in the form of a nanoparticle. The solution is combined with a polymer to form a mixture. The mixture is extruded to form the dispersion. The extrusion step occurs at a melt temperature above the degradation temperature of the metal precursor and the mixture has a residence time sufficient to form the dispersion within the extruder. In particular embodiments, the residence time is at least 35 seconds. The solution comprises from about 1 to about 30 wt % of the total weight of the combination of the polymer and the solution. The dispersion contains metal nanoparticles, metal oxide nanoparticles, or a combination thereof. The nanoparticles have an interparticle distance of from 0.1 nm to about 1500 nm in the dispersion. The nanoparticles in the dispersion comprise from about 0.125 to about 5 wt % of the total weight of the nanoparticles and the polymer.

The dispersion may further comprise a stabilizer. The stabilizer can be added to the mixture prior, during, or after the extrusion.

In embodiments, the metal precursor is a metal salt. In certain embodiments, the metal precursor contains zinc or silver. In others, the metal precursor contains a Group 11 element, Group 12 element, or a transition metal.

The solvent may be water.

The method may further comprise providing an additive to the dispersion. The additive can be added prior to, during, or after the extrusion of the dispersion. The additive can be a stabilizer.

The nanoparticles in the dispersion may comprise from about 0.125 to about 2 wt % of the total weight of the nanoparticles and the polymer. In more particular embodiments, the nanoparticles comprise about 0.125 wt %, about 0.25 wt %, about 0.5 wt %, about 1 wt %, or about 2 wt % of the total weight of the nanoparticles and the polymer.

In some specific embodiments, the metal precursor contains zinc or silver, the extrusion step has occurs at a melt temperature of at least 150° C., and the nanoparticles in the dispersion comprise from about 0.125 to about 2 wt % of the total weight of the nanoparticles and the polymer.

The extrusion step may use a twin screw extruder.

Also disclosed is a molded article comprising the dispersion produced by the methods described above. The dispersion may contain silver and/or zinc.

Also disclosed is an article of manufacture comprising the dispersion produced by the methods described above.

Disclosed in certain embodiments is a method for producing a polymer nanocomposite. The method comprises: providing a reaction mixture comprising a polymer and a metal salt dissolved in a solvent, the polymer comprising at least 70 wt % of the reaction mixture; and extruding the reaction mixture to form a polymer nanocomposite.

The polymer may be a polycarbonate (PC), acrylate-styrene-acrylonitrile terpolymer (ASA), polyetherimide (PEI), polycarbonate blended with polyetherimide (PC/PEI), polycarbonate blended with either acrylonitrile-butadiene-styrene terpolymer (PC/ABS) or methacrylate-butadiene-styrene terpolymer (PC/MBS), or polycarbonate-siloxane copolymer (PC-siloxane).

The solvent may be dimethylformamide (DMF), methanol (MeOH), water, dimethyl sulfoxide (DMSO), or ortho dichlorobenzene.

In some embodiments, the metal salt is a metal acetate, a metal nitrate, a metal carbonyl, or a metal acetylacetonate. An exemplary metal nitrate is silver nitrate ($AgNO_3$). An exemplary metal carbonyl is cobalt carbonyl ($CO_2(CO)_8$). An exemplary acetylacetonate is copper acetylacetonate ($Cu(C_5H_7O_2)_2$).

The nanocomposite may comprise metal or metal oxide nanoparticles. The nanoparticles may be silver nanoparticles. In other embodiments, the metal oxide nanoparticles may be composed of silver oxide (AgO or $Ag_2O$), cobalt oxide (CoO, $CO_2O_3$, or $CO_3O_4$), and copper oxide (CuO or $Cu_2O$).

Generally, the nanoparticles of the polymer nanocomposite have a particle size of from about 15 to about 200 nm. However, the particle size range may vary depending on the specific polymer included in the polymer nanocomposite. For example, when the polymer is a polycarbonate homopolymer, the nanoparticles may have a particle size of from about 20 to about 100 nm. When the polymer is a polycarbonate-polysiloxane copolymer, the nanoparticles may have a particle size of from about 25 to about 200 nm. In other embodiments, the nanoparticles may have a particle size of from about 70 to about 100 nm. When the polymer is a polyetherimide, the nanoparticles may have a particle size of from about 15 to about 50 nm. When the polymer is an acrylate-styrene-acrylonitrile terpolymer, the nanoparticles may have a particle size of from about 75 to about 100 nm.

Additives may be added to the reaction mixture to control the size and shape of the nanoparticles. In some embodiments, the additive may be mica, polyvinylpyrrolidone, nanosilica, or polyetherimide (PEI).

Nanocomposites produced by the disclosed methods and molded articles formed therefrom are also disclosed herein.

Further disclosed, in various exemplary embodiments, is a method for producing a polycarbonate nanocomposite, comprising: providing a solution containing a metal salt and a solvent, adding the solution to a polycarbonate to form a blend, the polycarbonate comprising at least 70 wt % of the blend, and extruding the blend to form a polycarbonate nanocomposite. For example, the blend may be extruded through an extruder.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 11 is a diagram of a suitable extruder that can be used to produce the nanocomposite/dispersion of the present disclosure.

DETAILED DESCRIPTION

Figure 1:
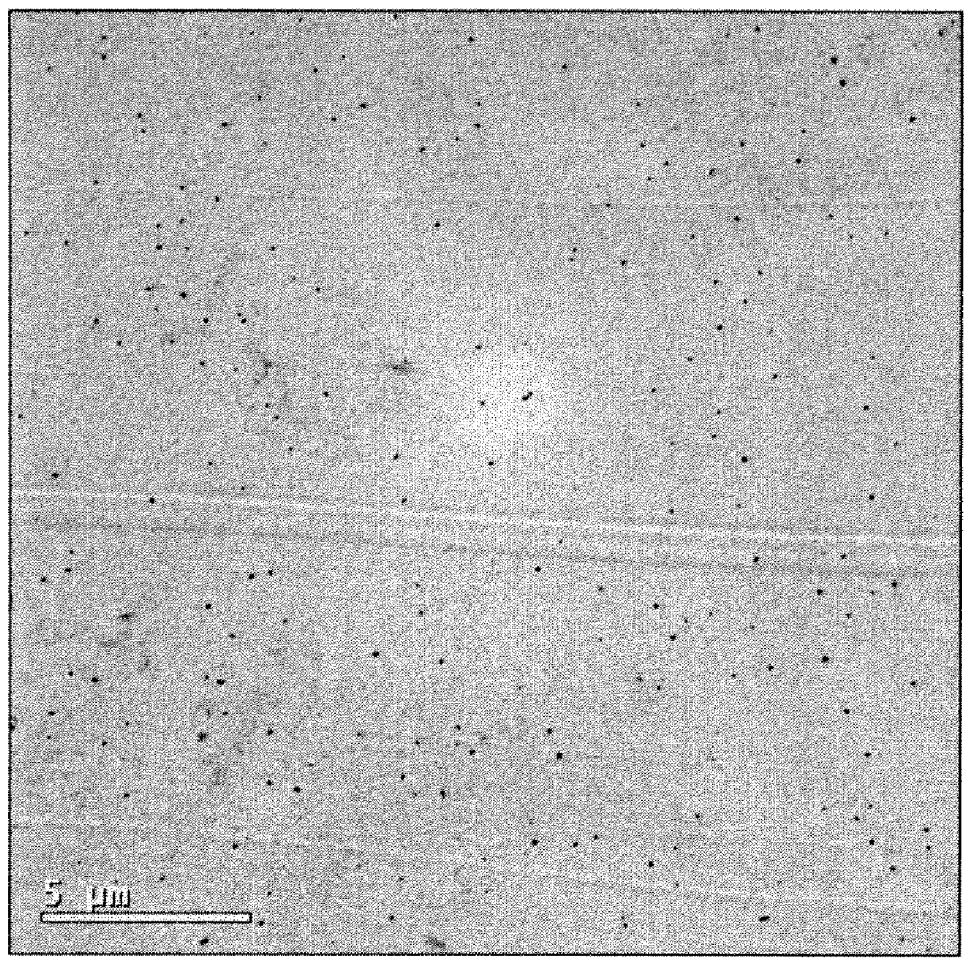
FIG. 1 is a TEM micrograph showing the morphology of a nanocomposite comprising silver nanoparticles in a PC matrix, formed as Example 1.
Figure 2:
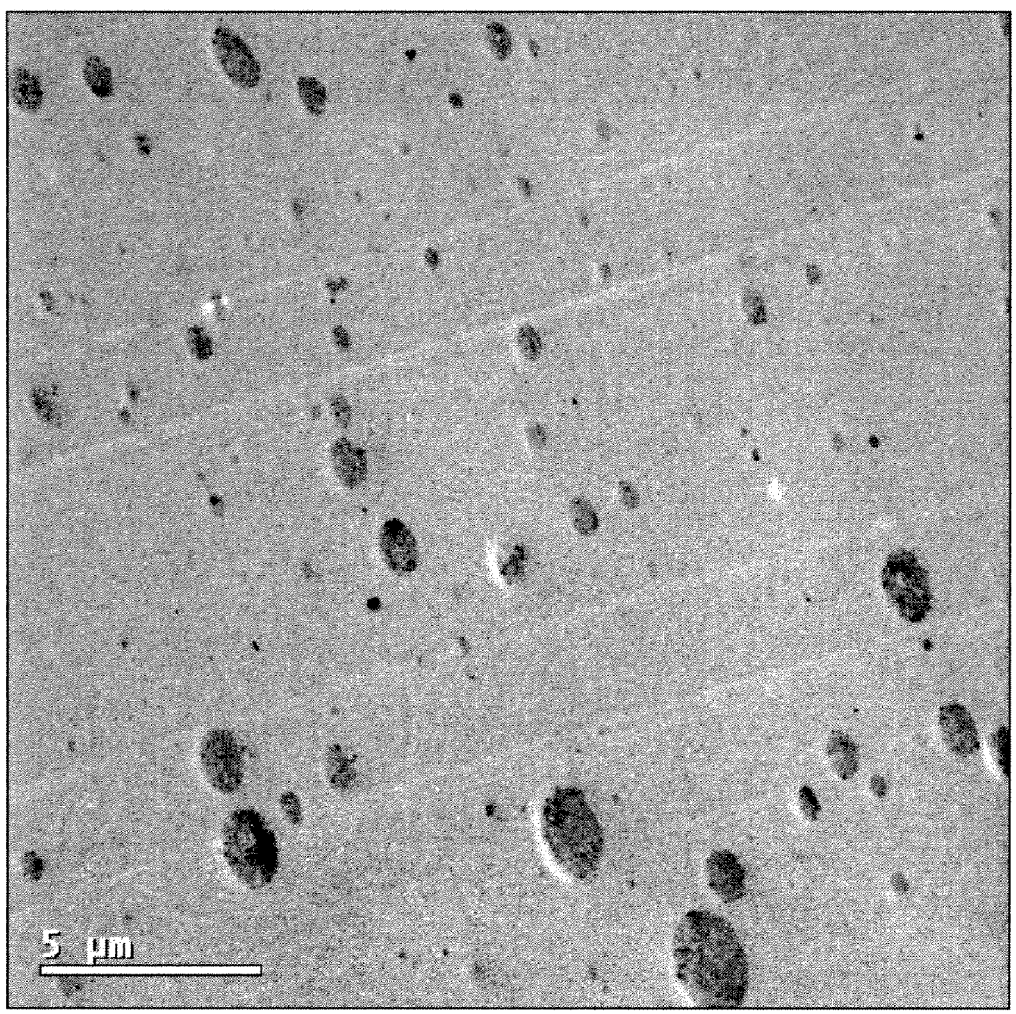
FIG. 2 is a TEM micrograph showing the morphology of a nanocomposite comprising silver nanoparticles in a PC/PEI matrix, formed as Example 3.
Figure 3:
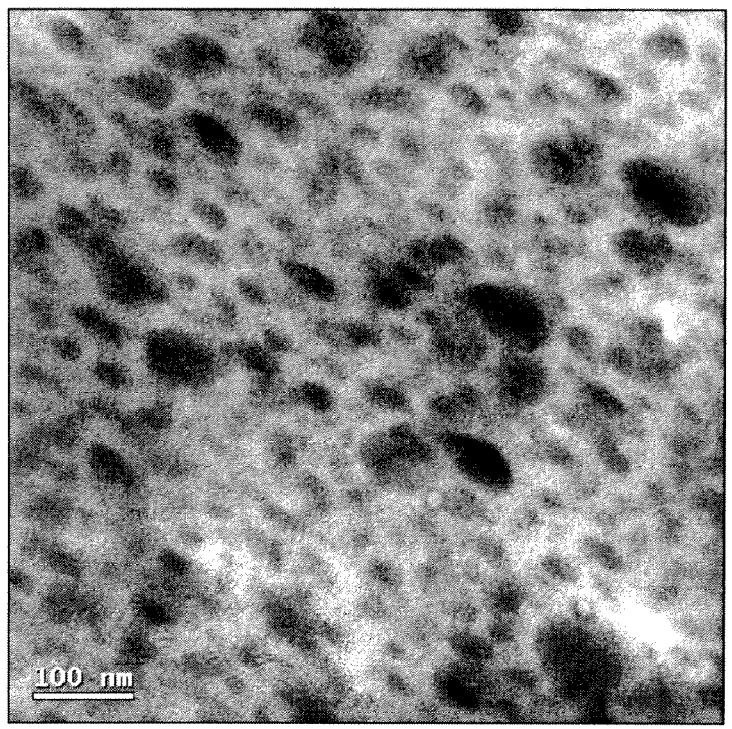
FIG. 3 is a TEM micrograph showing the morphology of a first exemplary embodiment of a nanocomposite comprising silver nanoparticles in a polycarbonate-polysiloxane copolymer matrix, formed as Example 4.
Figure 4:
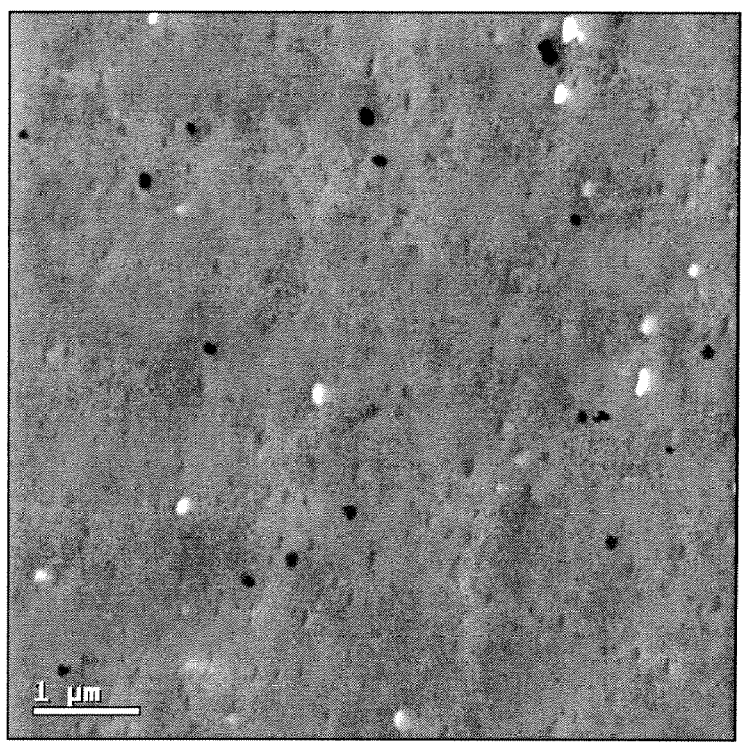
FIG. 4 is a TEM micrograph showing the morphology of a second exemplary embodiment of a nanocomposite comprising silver nanoparticles in a polycarbonate-polysiloxane copolymer matrix, formed as Example 5.
Figure 5:
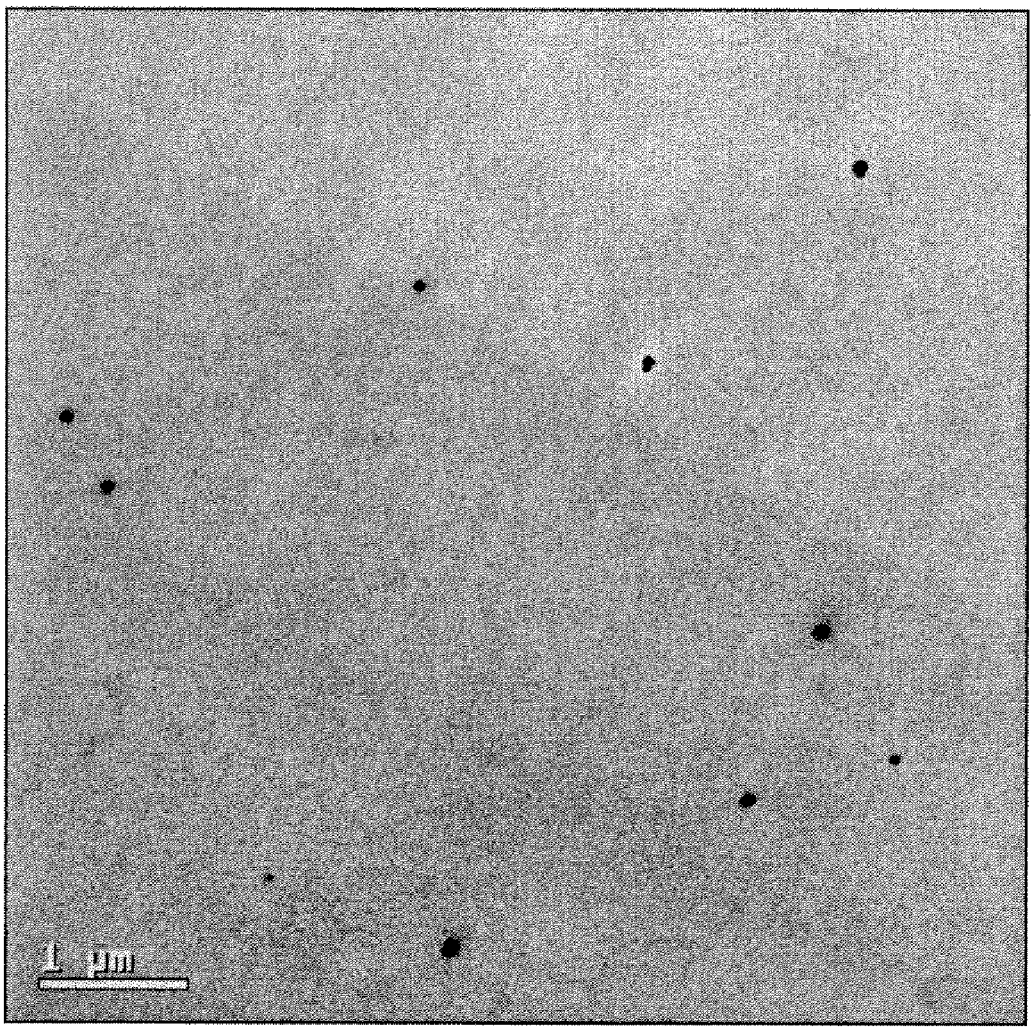
FIG. 5 is a TEM micrograph showing the morphology of a third exemplary embodiment of a nanocomposite comprising silver nanoparticles in a polycarbonate-polysiloxane copolymer matrix, formed as Example 6.
Figure 6:
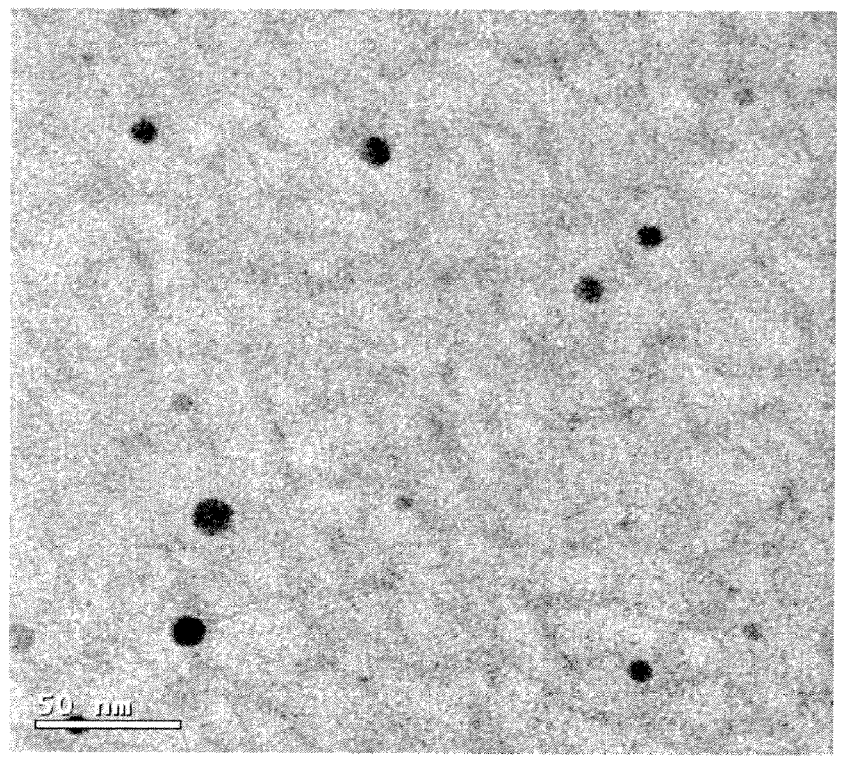
FIG. 6 is a TEM micrograph showing the morphology of a first exemplary embodiment of a nanocomposite comprising silver nanoparticles in a PEI matrix, formed as Example 7.
Figure 7:
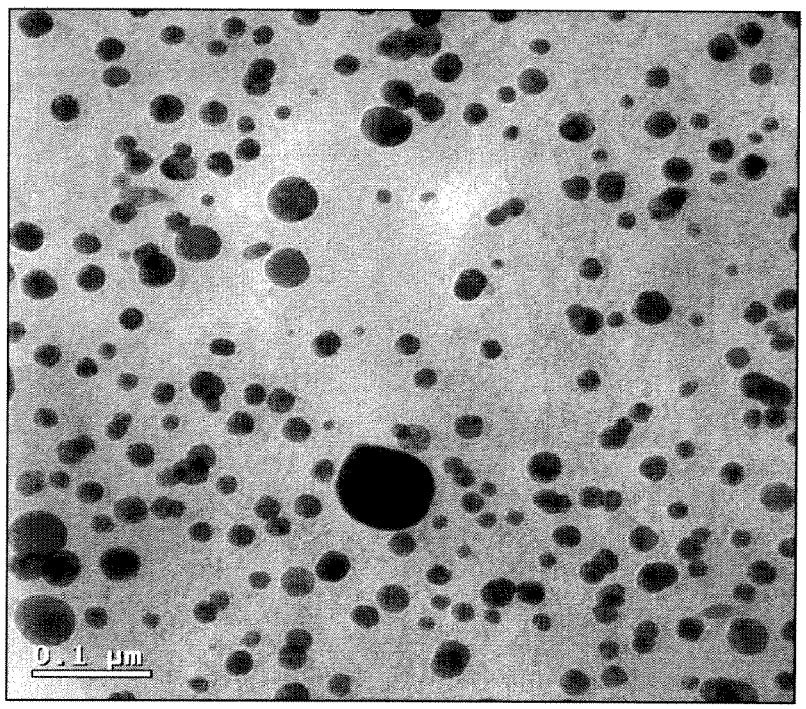
FIG. 7 is a TEM micrograph showing the morphology of Example 7 at higher magnification.
Figure 8:
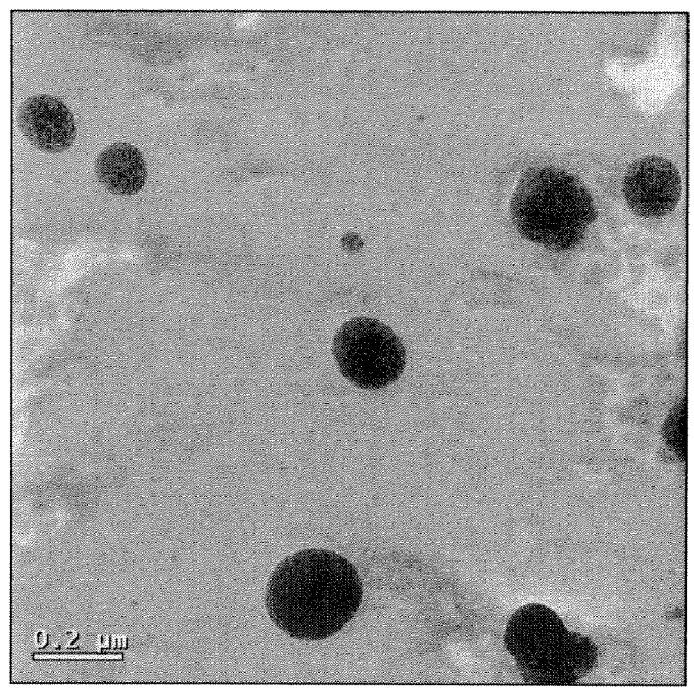
FIG. 8 is a transmission electron microscopy ("TEM") micrograph showing the morphology of a first exemplary embodiment of a nanocomposite comprising silver nanoparticles in an ASA matrix, formed as Example 9.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e. one or more hydrogen atoms is replaced) or unsubstituted. Exemplary alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Exemplary aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph—).

The term "cycloaliphatic" refers to an array of atoms which is cyclic but which is not aromatic. The cycloaliphatic group may include heteroatoms such as nitrogen, sulfur, selenium, silicon and oxygen in the ring, or may be composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperidinyl.

The term "cycloalkyl" refers to an array of atoms which is cyclic but is not aromatic, and which is composed exclusively of carbon and hydrogen. Cycloalkyl groups may be substituted or unsubstituted.

The term "aryl" refers to an array of atoms which is aromatic and which is composed exclusively of carbon and hydrogen. Aryl groups may be substituted or unsubstituted.

The term "perfluoroalkyl" refers to a linear or branched array of atoms that is composed exclusively of carbon and fluorine.

As discussed in more detail below, the polymer nanocomposites are produced from a reaction mixture comprising a polymer and a metal precursor dissolved in a solvent. As used herein, the term "mixture" refers to a combination of at least two ingredients, such as a polymer and a metal precursor. The term "mixture" should not be construed to require homogeneity throughout the combination of ingredients. The metal precursor is not in the form of a nanoparticle. The reaction mixture is extruded to form a polymer nanocomposite. The resulting nanocomposite comprises metal and/or metal oxide nanoparticles dispersed in a matrix of the polymer. The nanocomposite could also be described as a dispersion that contains a polymer and nanoparticles.

Several types of polymer are suitable for use in forming the polymer nanocomposite. In some embodiments, the polymer is a polycarbonate polymer. As used herein, "polycarbonate" refers to an oligomer or polymer comprising residues of one or more dihydroxy compounds joined by carbonate linkages; it also encompasses poly(carbonate-co-ester) oligomers and polymers.

Polycarbonate polymers generally contain a repeating structural carbonate unit of the formula (1):

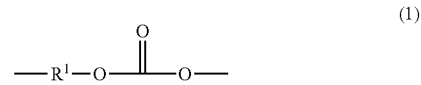

in which at least 60 percent of the total number of R$^1$ groups are aromatic organic radicals and the balance thereof are aliphatic, alicyclic, or aromatic radicals. In one embodiment, each R$^1$ is an aromatic organic radical, for example a radical of the formula (2):

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ may be a hydrocarbon group or a saturated hydrocarbon group such as methylene, cyclohexylidene, or isopropylidene.

Polycarbonates may be produced by the interfacial reaction of dihydroxy compounds having the formula HO—R$^1$—OH, which includes dihydroxy compounds of formula (3)

wherein Y$^1$, A$^1$ and A$^2$ are as described above. Also included are bisphenol compounds of general formula (4):

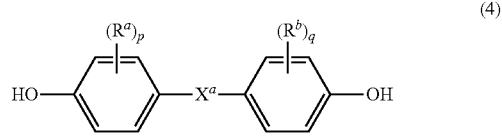

wherein R$^a$ and R$^b$ each represent a halogen atom or a monovalent hydrocarbon group and may be the same or different; p and q are each independently integers of 0 to 4; and $X^a$ represents one of the groups of formula (5):

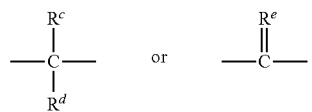

wherein $R^c$ and $R^d$ each independently represent a hydrogen atom or a monovalent linear or cyclic hydrocarbon group and $R^e$ is a divalent hydrocarbon group.

Polycarbonate copolymers are also contemplated for use in the instant processes. As used herein, the term "copolymer" refers to a polymer made of only two monomers. A specific type of copolymer is a polyester carbonate, also known as a polyester-polycarbonate. Such copolymers further contain, in addition to recurring carbonate chain units of the formula (1), repeating units of formula (8):

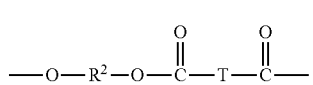

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

Another type of polycarbonate copolymer is a polycarbonate-polysiloxane copolymer. The polysiloxane (also referred to herein as "polydiorganosiloxane") blocks of the copolymer comprise repeating siloxane units (also referred to herein as "diorganosiloxane units") of formula (9):

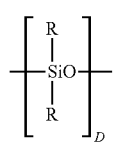

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (9) may vary widely depending on the type and relative amount of each component in the polymer, the desired properties of the polymer, and like considerations. Generally, D may have an average value of 2 to 1,000, specifically 2 to 500, and more specifically 5 to 100. The phrase "average value" is used to indicate that various siloxane blocks of siloxane units in the polycarbonate-polysiloxane copolymer may have different lengths.

In some embodiments, the siloxane unit may be derived from structural units of formula (10):

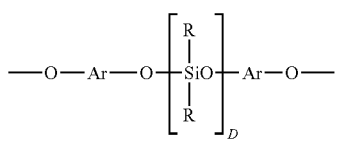

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (10) may be derived from a $C_6$-$C_{30}$ dihydroxyarylene compound, for example a dihydroxyarylene compound of formula (3) or (4) above. Combinations comprising at least one of the foregoing dihydroxyarylene compounds may also be used. Specific examples of dihydroxyarylene compounds are 1,1-bis(4-hydroxyphenyl) methane, 1,1-bis(4-hydroxyphenyl)ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl) propane. Combinations comprising at least one of the foregoing dihydroxy compounds may also be used.

Units of formula (10) may be derived from the corresponding dihydroxy compound of formula (11):

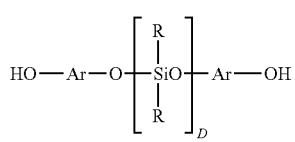

wherein R, Ar, and D are as described above. Compounds of formula (11) may be obtained by the reaction of a dihydroxyarylene compound with, for example, an alpha, omega-bisacetoxypolydiorganosiloxane under phase transfer conditions.

In other embodiments, the siloxane unit may be derived from structural units of formula (12):

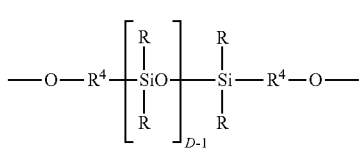
(12)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound.

In other embodiments, the siloxane unit may be derived from structural units of formula (13):

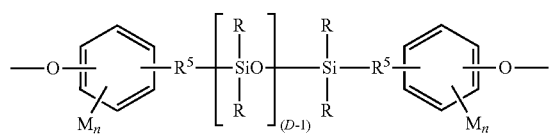
(13)

wherein R and D are as defined above. Each $R^5$ in formula (13) is independently a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (13) may be derived from the corresponding dihydroxy polydiorganosiloxane (14):

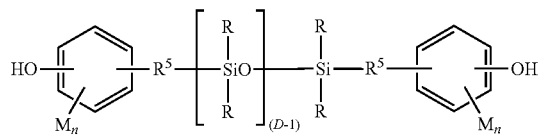
(14)

wherein R, D, M, $R^5$, and n are as described above. Such dihydroxy polysiloxanes can be made by effecting a platinum catalyzed addition between a siloxane hydride of formula (15):

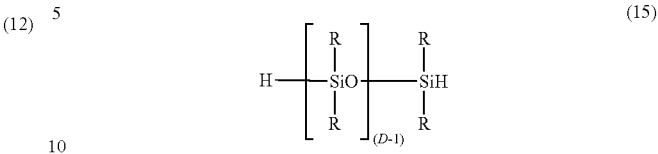
(15)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

In specific embodiments, the polycarbonate polymer is derived from a dihydroxy compound having the structure of Formula (I):

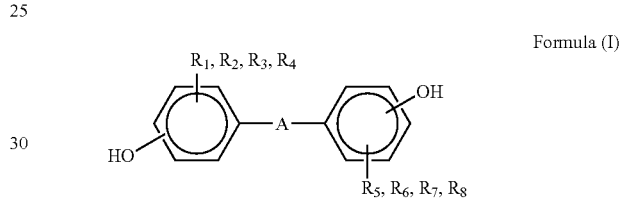
Formula (I)

wherein $R_1$ through $R_8$ are each independently selected from hydrogen, halogen, nitro, cyano, $C_1$-$C_{20}$ aliphatic, $C_1$-$C_{20}$ alkyl, $C_4$-$C_{20}$ cycloalkyl, and $C_6$-$C_{20}$ aryl; and A is selected from a bond, —O—, —S—, —$SO_2$—, $C_1$-$C_{12}$ alkyl, $C_6$-$C_{20}$ aromatic, $C_6$-$C_{20}$ cycloaliphatic, and $C_1$-$C_{20}$ aliphatic.

In specific embodiments, the dihydroxy compound of Formula (I) is 2,2-bis(4-hydroxyphenyl) propane (i.e. bisphenol-A or BPA). Other illustrative compounds of Formula (1) include:

2,2-bis(3-bromo-4-hydroxyphenyl)propane;
2,2-bis(4-hydroxy-3-methylphenyl)propane;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane,
4,4'-dihydroxy-1,1-biphenyl;
4,4'-dihydroxy-3,3'-dimethyl-1,1-biphenyl;
4,4'-dihydroxy-3,3'-dioctyl-1,1-biphenyl,
4,4'-dihydroxydiphenylether,
4,4'-dihydroxydiphenylthioether,
1,3-bis(2-(4-hydroxyphenyl)-2-propyl)benzene;
2,2-bis(4-hydroxy-3-isopropylphenyl)propane;
2,2-bis(3-t-butyl-4-hydroxyphenyl)propane;
2,2-bis(3-phenyl-4-hydroxyphenyl)propane;
2,2-bis(3,5-dichloro-4-hydroxyphenyl)propane;
1,1-bis(4-hydroxyphenyl)cyclohexane;
1,1-bis(3-chloro-4-hydroxyphenyl)-3,3,5-trimethylcyclohexane;
4,4' dihydroxy-1,1-biphenyl;
4,4'-dihydroxy-3,3'-dimethyl-1,1-biphenyl;
4,4'-dihydroxy-3,3'-dioctyl-1,1-biphenyl;
4,4'-dihydroxydiphenylether;

4,4'-dihydroxydiphenylthioether; and 1,3-bis(2-(4-hydroxyphenyl)-2-propyl)benzene.

The polymer used in the reaction mixture to form the polymer nanocomposite may be a polycarbonate homopolymer, a polycarbonate copolymer, or a polycarbonate-polysiloxane copolymer. Polycarbonate homopolymers are commercially available under the name LEXAN® from SABIC Innovative Plastics. Polycarbonate-polysiloxane copolymers are commercially available under the name LEXAN® EXL from SABIC Innovative Plastics. LEXAN® EXL copolymer offer superior impact and low temperature ductility compared to ordinary polycarbonates.

In some embodiments, the polycarbonate copolymer contains repeating units derived from dimethyl bisphenol cyclohexane (DMBPC), which is depicted below:

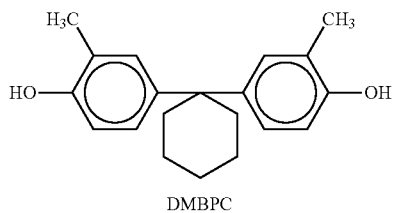

DMBPC

In other embodiments, the polymer used in the reaction mixture to form the polymer nanocomposite may be an acrylate-styrene-acrylonitrile terpolymer (ASA). ASA polymers are commercially provided by SABIC Innovative Plastics under the brand name GELOY®. These amorphous terpolymers offer great aesthetics, color options, good chemical resistance, high heat performance, and processability.

In other embodiments, the polymer used in the reaction mixture to form the polymer nanocomposite may be a polyetherimide (PEI). PEI polymers are commercially provided by SABIC Innovative Plastics under the brand name ULTEM®. These amorphous thermoplastic resins offer elevated thermal resistance, high strength and stiffness, and broad chemical resistance.

In yet other embodiments, the polymer used in the reaction mixture to form the polymer nanocomposite is a blend of polycarbonate with either acrylonitrile-butadiene-styrene terpolymer (PC/ABS) or methacrylate-butadiene-styrene terpolymer (PC/MBS). PC/ABS and PC/MBS blends are commercially available from SABIC Innovative Plastics under the brand name CYCOLOY®. These amorphous thermoplastic blends have many desired properties and/or characteristics, including high impact strength, heat resistance, good processability, weather and ozone resistance, good ductility, electrical resistance, aesthetic characteristics, etc. They are widely used in the automotive market, for producing appliance and electrical components, medical devices, and office and business equipment such as computer housings, etc.

The metal precursor in the reaction mixture provides the metal atoms from which the metal/metal oxide nanoparticles in the polymer nanocomposite are formed. The metal precursor contains the metal as a metal ion in a salt, whereas the nanoparticle is formed from the metal in oxidation state 0 or as a metal oxide. The metal precursor is not the same as a metal or metal oxide nanoparticle, and the metal precursor is not in the form of a nanoparticle. Rather, the metal precursor is reacted to form the metal or metal oxide nanoparticle. The metal contained in the metal precursor and the resulting nanoparticles may include silver (Ag), cobalt (Co), copper (Cu), gold (Au), platinum (Pt), palladium (Pd), iron (Fe), nickel (Ni), manganese (Mn), samarium (Sm), neodymium (Nd), praseodymium (Pr), gadolinium (Gd), titanium (Ti), zirconium (Zr), and indium (In), or zinc (Zn). The metal precursor may be an alloy (e.g. a binary or ternary alloy) containing the metal or a metal oxide. Exemplary silver precursors include silver trifluoromethanesulfonate ($AgCF_3SO_3$), silver tetrafluoroborate ($AgBF_4$), silver nitrate ($AgNO_3$), silver perchlorate ($AgClO_4$), silver acetate, silver hexanoate, and silver (diacetyl diacetonate). Exemplary cobalt precursors include $CoCl_2$ and $CoNO_3$. Exemplary iron precursors include $Fe(NO_3)_2$, $Fe(acetate)_2$, and $FeCl_2$. Exemplary zinc precursors include Zn(acetate) and $ZnNO_3$.

In specific embodiments, the metal precursor is a metal salt. Specific exemplary metal salts include silver nitrate ($AgNO_3$), cobalt carbonyl, and copper acetylacetonate ($Cu(C_5H_7O_2)_2$).

The solvent in the reaction mixture is generally any suitable polar solvent. In embodiments, the solvent is dimethylformamide (DMF), methanol (MeOH), water, dimethyl sulfoxide (DMSO), or ortho-dichlorobenzene (ODCB). A particularly desirable solvent for extrusion processes is water, because of its desirable volatility, low toxicity, low odor, and low chemical reactivity.

Other suitable solvents that can be employed include aliphatic alcohols having 1 to 4 carbon atoms, aliphatic ketones having 4 to 10 carbon atoms, chlorinated solvents having 1 to 6 carbon atoms, aromatic solvents having 6 to 20 carbon atoms, or chemically reducing solvents such as N,N-dimethylformamide (DMF), benzyl alcohol, dimethyl sulfoxide (DMSO), N-ethyl pyrrolidone, or N-methyl pyrrolidone (NMP). Specific non-limiting examples of solvents include, methanol, isopropanol, butanol, n-propanol, n-pentanol, 2-methoxypropanol, ethanol, isobutanol, tert-butanol, tert-pentanol, isopentanol, methyl isobutyl ketone, methyl propyl ketone, diethyl ketone, propyl methyl ketone, toluene, xylene, methyl salicylate, monochlorobenzene, dichlorobenzene, chloroform, carbon tetrachloride, dichloroethane, dichloromethane, 2,4-dimethylpentane, 1,4-dioxane, p-dioxane, dodecafluoro-1-hepatanol, ethanol, ethyl acetate, ethyl ether, ethyl formate, ethyl propionate, ethylene dichloride, formamide, heptane, 2-hexanone, i-butyl acetate, i-butyl alcohol, i-butyl formate, i-butylamine, i-octane, isopropyl acetate, i-propyl ether, methanol, 2-methoxyethanol, methyl acetate, methyl ethyl ketone (MEK), methyl n-butyrate, 1-methyl-2-propanol, 2-methyl-3-butanone, 2-methyl-4-pentanone, 2-methyl-2-propanol, methylene chloride, 2-methylhexane, 3-methylhexane, 3-methylpentane, 2-methylpentane, 3-n-decane, n-hexane, nitrobenzene, nitroethane, nitromethane, 2-nitropropane, 1-octafluoropentanol, octane, 2-pentanone, 3-pentanone, 1-propanol, 2-propanol, propionaldehyde, propionic acid, propionitrile, propyl ether, propyl formate, propylamine, propyl acetate, pyridine, t-butyl methyl ether, tetrahydrofuran, toluene, triethylamine, trifluoroacetic acid, trifluoroethanol, trifluoropropanol, trimethylbutane, 2,2,3-trimethylhexane, 2,2,5-trimethylpentane, 2,2,4-valeronitrile, water, p-xylene, heptane, acetic anhydride, acetone, acetonitrile, benzene, benzonitrile, benzyl ether, 1-butanol, 2-butanol, 2-butanone, butyl acetate, sec-butyl acetate, butyl ether, butyl ethyl ether, butyl formate, 2-butylamine, butyraldehyde, butyric acid, butyronitrile, 2-chlorobutane, 1-chloropropane, 2-chloropropane, cyclohexane, diethyl carbonate, di-isopropylamine, 2,2-dimethylbutane, 2,3-dimethylbutane, 2,3-dimethylpentane, ethylene glycol, and polyethylene glycol.

The reaction mixture may comprise from about 70 to about 99 weight percent (wt %) of the polymer, from about 1 to about 20 wt % of the metal precursor, and from about 0.01 to about 10 wt % of the solvent. It should be noted that in these relative amounts, the polymer cannot be considered dissolved in the solvent, but is relatively solid. In fact, the preferred solvents for the metal salts are those that do not dissolve the polymer, because this would interfere with effective mixing of the metal salt with the polymer. Only the metal precursor is dissolved in the solvent. In specific embodiments, the starting reaction mixture may comprise about 90 wt % of the polymer, from about 1 to about 3 wt % of the metal precursor, and from about 7 to about 9 wt % solvent (in which the metal precursor is dissolved).

The reaction mixture comprising the polymer, metal precursor, and solvent can then be reacted to form a polymer nanocomposite. Generally, the reaction mixture can be prepared by first dissolving the metal precursor in the solvent to form an initial metal solution. The metal precursor may be present in an amount of from about 40 to about 67 wt % in the initial metal solution. The solvent may be present in an amount of from about 33 to about 60 wt % of the initial metal solution. In other embodiments, the solution (containing the metal precursor and solvent) comprises from about 1 to about 30 wt % of the total weight of the polymer and the solution.

The initial metal solution is then mixed or combined with the polymer to form the reaction mixture. In some embodiments, the polymer is in powder form when mixed with the initial metal solution. In other embodiments, the polymer is in pellet form when mixed with the initial metal solution. In still other embodiments the metal solution is fed into the extruder with the polymer being in powder or pellet form. In still other embodiments, the metal solution is fed into the extruder after the polymer is fully melted. In some embodiments, the reaction mixture is fed to an extruder at a specified feed rate and melt extruded from an exit end of the extruder at a specified temperature and with a specified residence time to form the polymer nanocomposite or dispersion. The thermal energy and shear exerted during the melt extrusion process result in the production and dispersion of metal and/or metal oxide nanoparticles throughout the polymer, forming the polymer nanocomposite. The melt temperature of the extruder is above the degradation temperature of the metal precursor. The reaction mixture has a residence time of at least 35 seconds in the extruder. The nanocomposite may be cooled in a water bath, then cut into cylindrical pellets after cooling.

In some embodiments, the extruder is a twin-screw extruder, such as a co-rotating closely intermeshing twin-screw extruder. The extruder may have a screw diameter of about 20 mm to about 30 mm, including about 25 mm, and a length to diameter ratio of from about 25 to about 35. The ratio of the external extruder diameter and the internal extruder diameter is from 1.50 to 1.60. The feed rate to the extruder may be from about 5 to about 15 kg/hr. The extruder may have a screw speed of about 300 rpm. The extruder may be operated at an extrusion temperature of from about 200° C. to about 340° C.

The exit end of the extruder may comprise a die-plate. The die-plate generally has holes that determine the size of the resulting extrusion. For example, the die-plate may have two 4 mm diameter holes.

FIG. 11 is a diagram of a suitable extruder that can be used to process the reaction mixture and form the nanocomposite/dispersion. The extruder 100 has a diameter D and a length L. The reaction mixture enters the extruder through a feed section 110 and passes through a solids conveying section 120 prior to entering a melting section 130. The melting section 130 has a length 132 of approximately 3.6 times the diameter, i.e. 3.6 D. The reaction mixture subsequently passes through a first mixing section 140 downstream of the melting section, then through a second mixing section 150 before being extruded. The first mixing section 140 has a length 142 of approximately 1.3 times the diameter, i.e. 1.3 D. The second mixing section 150 has a length 152 of approximately 1.9 times the diameter, i.e. 1.9 D. The nanocomposite/dispersion is extruded through a die 160. Gases may be vented through vent 170.

Alternatively, the nanocomposite may be formed in a batch reactor, such as a continuous stirred tank reactor (CSTR), a Banbury mixer, a Brabender® Plasti-Corder®, or a Haake internal mixer with an vent to remove the volatile by-products. The reactor are heated to melt the reaction mixture (i.e. polymer, solvent and metal precursor) to a temperature of from about 150° C. to about 300° C. After mixing for a period of from about 1 minute to about 10 minutes, a polymer nanocomposite is produced.

The polymer nanocomposite comprises metal nanoparticles dispersed throughout a polymer matrix. In narrower embodiments, the metal nanoparticles are metal oxide nanoparticles. In some embodiments, the metal is a noble metal, which is more stable in its reduced state and resistant to oxidation. In particular embodiments, the metal/metal oxide nanoparticles comprise a metal containing at least one of the following: silver, zinc, cobalt, copper, gold, platinum, palladium, iron, nickel, manganese, samarium, neodymium, praseodymium, gadolinium, titanium, zirconium, and indium. In more specific embodiments, the metal is selected from at least one of the following: silver, zinc, cobalt, and copper. In other embodiments, the metal precursor contains a Group 11 element, a group 12 element, or a transition metal. In even more specific embodiments, the metal is silver or zinc.

In embodiments, the metal nanoparticles comprise 5 wt % or less of the polymer nanocomposite, based on the total weight of the nanoparticles and the polymer in the nanocomposite/dispersion. In other embodiments, the amount of metal nanoparticles in the nanocomposite ranges from about 0.125 wt % to about 2 wt %, based on the total weight of the nanoparticles and the polymer in the nanocomposite/dispersion. In exemplary embodiments, the amount of metal nanoparticles in the nanocomposite is about 0.125 wt %, about 0.25 wt %, about 0.5 wt %, about 1 wt %, or about 2 wt %, based on the total weight of the nanoparticles and the polymer in the nanocomposite/dispersion.

The metal nanoparticles can generally be any shape, including irregular, spherical, and cubic. In some embodiments, the nanoparticles have a particle size of from about 10 nm to about 200 nm. The term "particle size" refers to the longest length of the particle along its axes. For example, the particle size of a spherical particle would refer to its diameter, while the particle size of a cubic particle would refer to its diagonal.

Some representative examples of polymers and nanoparticle particle sizes follow herein. When the polymer is a polycarbonate homopolymer, the nanoparticles may have a particle size of from about 20 to about 100 nm. When the polymer is a polycarbonate-polysiloxane copolymer, the nanoparticles may have a particle size of from about 25 to about 200 nm, including from about 70 to about 100 nm. When the polymer is a polyetherimide, the nanoparticles may have a particle size of from about 15 to about 50 nm. When the polymer is an acrylic-styrene-acrylonitrile terpolymer, the nanoparticles may have a particle size of from about 75 to about 100 nm.

The metal nanoparticles are dispersed throughout the polymer matrix. This dispersion can be measured in terms of the inter-particle distance ("IPD"), using methods known in the art. As used herein, the term "inter-particle distance" refers to an average value of the distance between the surfaces of any two nanoparticles dispersed in the polycarbonate matrix. As used herein, the term "agglomerates" means that the IPD of the nanoparticles in the polycarbonate matrix is less than 0.1 nm. In contrast, the IPD of the nanoparticles produced by the methods of this disclosure are from 0.1 nm to about 1500 nm.

The polymer nanocomposite may further comprise one or more additives. The additive(s) may be present in quantities of up to about 20 wt %, and specifically in quantities of from 0.00001 to about 15 wt %, based on the weight of the nanocomposite comprising the additive(s). These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers, processing aids, other oligomeric species, and other polymeric species. The different additives that can be incorporated into the polycarbonate nanocomposites are typically those that are commonly used in resin compounding and can be added prior to, during, or after the extrusion of the reaction mixture, with the proviso that the additives are selected so as not to adversely affect the desired properties of the polymer nanocomposite.

A nanoparticle size stabilizer may be added to the reaction mixture before the polymer nanocomposite is formed. The stabilizer may be polymer, organic, or inorganic. In particular embodiments, the stabilizer is mica, nanosilica, polyvinylpyrrolidone (PVP), a polycarbonate powder, or polyetherimide. The stabilizer may be added in the amount of from about 1 to about 8 wt % of the reaction mixture. These stabilizers might be helpful in controlling the shape or size of the nanoparticles by allowing the nanoparticles to coat or deposit on the surface of the stabilizer, such as mica.

If desired, the polymer nanocomposite may further comprise a stabilizer. In embodiments, the stabilizer is selected from the group consisting of nano-sized fillers, polymeric coordinating stabilizers, and solvents that have a coordinating group. The term "coordinating" refers to a functional group or stabilizer that enables charge-transfer complex formation or which chelates with the metal precursor or metal nanoparticle at a stage in the reaction. Exemplary nano-sized fillers include nanosilica, nanoalumina, aluminosilicates (with or without stabilizers), nanozirconia, any other metal oxide having an isotropic or anisotropic shape, montmorillonite (with or without organic modifiers), mica, and other metal silicates available in spherical, platelet, and/or particulate shapes. Exemplary polymeric coordinating stabilizers can generally have any structure, such as linear, nonlinear, dendrimer, or hyperbranched polymer structures. The polymeric coordinating stabilizer will generally have polar functional groups in the main chain backbone or a pendant group. Exemplary polar functional groups include anhydride groups, hydroxyl groups, cyanonitrile groups, carbon-carbon double bonds, amine groups, acetamide groups, ether groups, acid groups, esters, epoxy, pyrrolidone, morpholine, oxazoline, sulfonate, thioester, carbonate, and siloxane. Exemplary polymeric coordinating stabilizers include ionomeric polymers, polyethylene glycol, poly(2-ethyl-2-oxazoline), polyvinylpyrrolidone, polymethyl methacrylates, styrene acrylonitrile, styrene acrylic acid, and styrene GMA copolymers. In other embodiments, the stabilizer is an organo-titanate or organozirconate. In other embodiments, the stabilizer is an organosilane or organosiloxane. Exemplary organosiloxanes include oligomeric linear or cyclic siloxanes such as octamethyltetrasiloxane or hexamethyltrisiloxane. Exemplary organosilanes include organoalkyoxysilanes such as phenyltrimethoxysilane, diphenyldimethoxysilane, polyethyleneglycoltrimethoxysilane, phenethyltrimethoxysilane, gamma-methacryloxypropyltrimethoxysilane, gamma-aminopropyltrimethoxysilane, glycidyloxypropyltrimethoxysilane, N-aminoethyl-3-aminopropyltrimethoxysilane, aminoethylaminopropylmethyldimethoxysilane, aminoethylaminopropyltrimethoxysilane, methyltrimethoxysilane, methyltriethoxysilane, mercaptopropyltrimethoxysilane, mercaptopropylmethyldimethoxysilane, chloropropyltrimethoxysilane, chloropropyltriethoxysilane, chloropropylmethyldimethoxysilane, phenyltriethoxysilane, diphenyldiethoxysilane, polyethyleneglycoltriethoxysilane, phenyltriethoxysilane, gamma-methacryloxypropyltriethoxysilane, gamma-aminopropyltriethoxysilane, glycidyloxypropyltriethoxysilane, and N-aminoethyl-3-aminopropyltriethoxysilane. Additional stabilizers include diphenyl isodecyl phosphite (DPDP). The stabilizer can be added to the reaction mixture prior to, during, or after the reaction of the reaction mixture.

Unlike prior methods where the polymer is typically dissolved in a solvent, the polymer here is solid and is not dissolved. In addition, no high pressure or closed reactor is necessary for this synthesis. Instead, only high temperatures are used to melt the polymer, convert the metal precursors, and simultaneously evaporate the solvent. An open continuous system, such as an extruder, can form these compositions within a short period of time. In some embodiments, the composites require a residence time of at least 35 seconds.

The polymer nanocomposites disclosed herein can be used in applications where a combination of properties like transparency, hardness, and good melt flow for moldability are required. The polymer nanocomposites may be formed into articles by conventional plastic processing techniques. Molded articles may be made by compression molding, blow molding, injection molding or such molding techniques known to those skilled in the art. Nanocomposites comprising silver nanoparticles might be useful as plastic storage containers, food packaging materials, glazing, sheets, clothes, and ballistic protection materials (e.g. bulletproof vests). They could also be useful in IR reflective coatings, optical data storage applications, biological labels, electroluminescent displays, antibacterial/antiviral applications, and biodetection applications. It is noted that the IR reflectivity of the nanocomposite increases as the concentration of silver nanoparticles increases. Nanocomposites comprising cobalt nanoparticles might be useful in magnetic recording, medical sensors, electronic packaging, IR reflective coatings, scratch resistant coatings, tool coatings, and barrier applications.

In one set of particular embodiments, the metal precursor contains silver and/or zinc; the extrusion step occurs at a melt temperature of at least 150° C.; and the nanoparticles in the resulting dispersion comprise from about 0.125 to about 2 wt % of the total weight of the nanoparticles and the polymer.

In other embodiments, the resulting dispersion contains from metal nanoparticles, metal oxide nanoparticles, or a combination thereof; the nanoparticles have an IPD of from 0.1 nm to about 1500 nm in the dispersion; and the nanoparticles comprise from about 0.125 to about 2 wt % of the total weight of the nanoparticles and the polymer.

In another embodiment, the combinations and subcombinations of the dependent claims should be considered to be disclosed herein. References to a range in, for example time period or temperature, should be considered as including any intermediate values within the range, and as including any sub-ranges.

The following examples are provided to illustrate the compositions and methods of the present disclosure. The examples are merely illustrative and are not intended to limit devices made in accordance with the disclosure to the materials, conditions, or process parameters set forth therein.

EXAMPLES

Several polymer nanocomposites were made as described herein. Particle size was determined using TEM, and the oxidation state of the metal or metal oxide nanoparticles was determined by x-ray diffraction (XRD).

Examples 1-9

Example 1 was produced using the following procedure. 40 wt % of silver nitrate was dissolved in 60 wt % of dimethylformamide (DMF) at 40° C. The solution was mixed with a 100% bisphenol A homopolymer (BPA-PC) having a $M_w$ of about 60,000, $M_n$ of about 28,000, and polydispersity of about 2.2. The powder/solution blend was then partially dried at 40° C. to remove part of the solvent and obtain a powdered reaction mixture which was then easily fed into the hopper of an extruder. The reaction mixture was then fed to a twin-screw extruder with a diameter of 25 mm and a length to diameter (L/D) ratio of 25.6. The temperature of the extruder was set at 280° C. The feed rate to the extruder was 8 kg/hr and the screw speed was 300 rpm.

Example 2 was made using the same procedure as Example 1, but with dimethyl sulfoxide (DMSO) as the solvent instead of DMF.

Example 3 was made using the same procedure as Example 1, but with DMSO as the solvent instead of DMF. In addition, the polymer used was a blend of BPA-PC homopolymer and PEI homopolymer having a weight ratio of 70:30 (BPA-PC homopolymer: PEI homopolymer). The PEI fraction of the blend was first mixed with the metal precursor solution and then added to the extruder with the BPA-PC polymer. In addition, the extruder temperature was set at 340° C.

Example 4 was made using the same procedure as Example 1, but with an PC-siloxane copolymer as the polymer and DMSO as the solvent. The PC-siloxane copolymer was a random copolymer with a Mw of 23,000 and a polydispersity of 2.5. The siloxane domains were dimethylsiloxane and had an average length of 30. The siloxane domains were 6 mole % of the copolymer, and their domain size was less than 10 nm. The siloxane domains of the copolymer acted as a stabilizer. Also, the PC-siloxane copolymer was compounded with silver nitrate/DMSO solution.

Example 5 was made using the same procedure as Example 4, but with a PC-siloxane copolymer as the polymer. The PC-siloxane copolymer was a random copolymer with a Mw of 23,000 and a polydispersity of 2.5. The siloxane domains were dimethylsiloxane and had an average length of 45. The siloxane domains were 6 mole % of the copolymer, and their domain size was 5-15 nm.

Example 6 was made using the same procedure as Example 4, but with an opaque PC-siloxane copolymer as the polymer. The opaque PC-siloxane copolymer was a random copolymer with a Mw of 30,000 and a polydispersity of 2.65. The siloxane domains were dimethylsiloxane and had an average length of 45. The siloxane domains were 20 mole % of the copolymer, and their domain size was 5-20 nm.

Example 7 was made using the same procedure as Example 1, but with DMSO as the solvent instead of DMF and PEI was used as the polymer instead of BPA-PC.

Example 8 was made using the same procedure as Example 1, but with DMSO as the solvent instead of DMF and with mica added as a stabilizer.

Example 9 was made using the same procedure as Example 1, but with acrylate-styrene-acrylonitrile terpolymer (ASA) as the polymer instead of BPA-PC.

The amount of polymer used in each Example was varied to obtain nanocomposites containing different amounts of nanoparticles. Results for Examples 1-9 are summarized in Table 1.

TABLE 1

| Example | Polymer | Solvent | Wt % of Metal Nanoparticles | Stabilizer and Loading | Particle Size (nm) |
|---|---|---|---|---|---|
| 1 | BPA-PC | DMF | 1.5 | NA | 25-75 |
| 2 | BPA-PC | DMSO | 1 | NA | 25-75 |
| 3 | PC-PEI | DMSO | 1 | PEI 30% (from polymer) | 15-50 |
| 4 | PC-siloxane (UC) | DMSO | 1 | Siloxane Domains | 150-200 |
| 5 | PC-siloxane (Clear) | DMSO | 1 | Siloxane Domains | 70-100 |
| 6 | PC-siloxane (Opaque) | DMSO | 1 | Siloxane Domains | 25-50 |
| 7 | PEI | DMSO | 1 | NA | 15-50 |
| 8 | BPA-PC | DMSO | 2 | Mica | 20-70 |
| 9 | ASA | DMF | 1 | NA | 75-100 |

In each of Examples 1-9, the decomposition temperature of the silver nitrate salt, i.e. the temperature at which nanoparticles formed, was 150° C. and the nanoparticles were silver (Ag(0)) having a spherical shape. Example 7 produced a translucent nanocomposite. In Example 3, the silver preferred the PEI phase. FIGS. 1-8 are TEM micrographs of Examples 1, 3, 4, 5, 6, 7, 7, and 9, respectively. Generally speaking, these figures show good dispersion of the silver nanoparticles.

Examples 10-14

In Example 10, 66.7 wt % silver nitrate was dissolved in 33.3 wt % of water. The solution was homogeneously mixed in BPA-PC powder (PC powder) to yield a nanocomposite having 0.125 wt % silver nanoparticles. The mixture of the powder and solution was then fed to a co-rotating closely intermeshing twin-screw extruder with a diameter of 25 mm, a L/D ratio of 33.2, and a diameter ratio of 1.50. The barrels of the extruder were set at 300° C., the die-head at 310° C. The screwspeed of the extruder was 300 rpm and the rate was 10 kg/hour, creating a minimum residence time in the extruder of approximately 35 seconds, which was needed to achieve complete thermal reduction of the silver nitrate in the extruder. The extruded nanocomposite passed out of two 4 mm holes in a die plate at the end of the extruder. The strands passing through the holes were cooled in a water-bath and cut into cylindrical pellets having a length of about 3 mm.

Examples 11-14 were made using the same procedure as Example 10, but with the concentration of the components altered to produce a nanocomposite having the weight percentage of silver nanoparticles shown in Table 2. The results for Examples 10-14 are also summarized in Table 2.

TABLE 2

| Example | Polymer | Solvent | Wt % of Metal Nanoparticles | Particle Size (nm) |
|---|---|---|---|---|
| 10 | BPA-PC | Water | 0.125 | 30-50 |
| 11 | BPA-PC | Water | 0.25 | 30-70 |

TABLE 2-continued

| Example | Polymer | Solvent | Wt % of Metal Nanoparticles | Particle Size (nm) |
|---|---|---|---|---|
| 12 | BPA-PC | Water | 0.5 | 50-100 |
| 13 | BPA-PC | Water | 1 | 50-100 |
| 14 | BPA-PC | Water | 2 | 50-100 |

In each of Examples 10-14, the decomposition temperature of the silver nitrate salt was 150° C. and the nanoparticles were silver (Ag(0)) having a spherical shape. These examples demonstrated that a higher wt % of metal nanoparticles could be achieved by increasing the concentration of the silver nitrate solution in the mixture with the polymer.

Examples 15-17

In Example 15, 125.6 grams of silver nitrate was dissolved in 62.7 grams of water. 6.4 grams of polyvinylpyrrolidone (PVP) was then added to the solution as stabilizer. A reaction mixture was then formed from polycarbonate powder and the solution containing PVP. The solution containing PVP was added to the reaction mixture at a concentration sufficient to produce a nanocomposite comprising 1.0 wt % silver nanoparticles and 800 ppm PVP after extrusion. The reaction mixture of PC powder, silver nitrate, PVP, and water was then fed to a twin-screw extruder with a diameter of 25 mm and a L/D ratio of 33.2. The feed rate to the extruder was 15 kg/hr and the screwspeed of the extruder was 300 rpm. The procedure for removing, cooling, and cutting the nanocomposite was the same as that of Example 10.

Examples 16 and 17 were made using the same procedure as Example 15, but with the concentration of the components altered to produce a nanocomposite having the weight percentage of silver nanoparticles shown in Table 3. Results for Examples 15-17 are summarized in Table 3.

TABLE 3

| Example | Polymer | Solvent | Wt % of Metal Nanoparticles | Stabilizer and Loading | Particle Size (nm) |
|---|---|---|---|---|---|
| 15 | BPA-PC | Water | 1.0 | PVP 800 ppm | 50-100 |
| 16 | BPA-PC | Water | 0.5 | PVP 400 ppm | 50-100 |
| 17 | BPA-PC | Water | 2 | PVP 1600 ppm | 50-100 |

In each of Examples 15-17, the decomposition temperature of the silver nitrate salt was 150° C. and the nanoparticles were silver (Ag(0)) having a spherical shape. These examples demonstrated that PVP acts as a stabilizer to substantially reduce or prevent spherical Ag(0) nanoparticles from being oxidized to silver oxide. Without being bound by theory, the water/PVP coordinates the silver nitrate and upon decomposition improves particle distribution throughout the polymer, and also produces a non-cyclic particle by controlling directional growth of the crystal. PVP also prevents surface oxidation of the metal nanoparticles, and controls the spherical shape of the resulting metal particles.

Examples 18-20

In Example 18, 66.7 wt % of silver nitrate was dissolved in 33.3 wt % of water. The solution was mixed with polycarbonate powder, and this mixture was then mixed with a master batch of PVP in BPA-PC to form a reaction mixture. The concentration of PVP in the BPA-PC was 0.152 wt %. The silver nitrate was present in the reaction mixture at a concentration sufficient to produce a nanocomposite comprising 0.5 wt % silver nanoparticles after extrusion, and the PVP was present in the reaction mixture in an amount sufficient to produce a nanocomposite comprising 800 ppm PVP after extrusion. The reaction mixture was fed to a twin-screw extruder at a rate of 10 kg/hr. The extruder had a diameter of 25 mm, a length to diameter ratio of 33.2, and a screwspeed of 300 rpm. The procedure for removing, cooling, and cutting the nanocomposite was the same as that of Example 10.

Examples 19 and 20 were made using the same procedure as Example 18, but with the concentration of the components altered to produce a nanocomposite having the weight percentage of silver nanoparticles shown in Table 4. The results of Examples 18-20 are summarized in Table 4. All silver concentrations were verified by x-ray fluorescence (XRF). The calibration line was produced using ICP.

TABLE 4

| Example | Polymer | Solvent | Wt % of Metal Nanoparticles | Stabilizer and Loading | Particle Size (nm) |
|---|---|---|---|---|---|
| 18 | BPA-PC | Water | 0.5 | PVP 800 ppm | 50-100 |
| 19 | BPA-PC | Water | 1 | PVP 800 ppm | 50-100 |
| 20 | BPA-PC | Water | 2 | PVP 800 ppm | 50-100 |

In each of Examples 18-20, the degradation temperature of the nanocomposite produced was 150° C. and the nanoparticles were silver (Ag(0)) having a spherical shape. These examples demonstrated that PVP acts as a stabilizer to prevent or substantially reduce spherical Ag(0) nanoparticles from being oxidized to silver oxide.

Examples 21-24

In Examples 21-24, 66.7 wt % silver nitrate was dissolved in 33.3 wt % of water and labeled Solution A. Solution A was then mixed with polycarbonate powder in different amounts to form two different mixtures. The first mixture was labeled PC Ag-mixture I and comprised 95.6 wt % PC 105 and 4.4 wt % Solution A. The second mixture was labeled PC Ag-mixture II and comprised 92.3 wt % PC 105 and 7.7 wt % Solution A. PC 105 was a BPA-PC homopolymer with a Mw of 30,500 and a polydispersity of 2.5.

PC Ag-mixtures I and II were combined with a BPA/DMBPC copolymer containing 2 wt % nanosilica and fed to a screw extruder at different concentrations. The BPA/DMBPC copolymer was 65 mole % BPA and 35 mole % DMBPC. The feed rate to the extruder was 15 kg/hr. The extruder had a diameter of 25 mm, a length to diameter ratio of 33.2, and a screwspeed of 300 rpm. The procedure for removing, cooling, and cutting the nanocomposite was the same as that of Example 10.

Table 5 shows the mixtures made to form Examples 21-24.

TABLE 5

| | Unit | Ex. 21 | Ex. 22 | Ex. 23 | Ex. 24 |
|---|---|---|---|---|---|
| Total Weight | grams | 2500 | 2500 | 2500 | 2500 |
| BPA/DMBPC | wt % | 50 | 25 | 75 | 50 |
| PC Ag-mixture I | wt % | 50 | 75 | 25 | |

TABLE 5-continued

|  | Unit | Ex. 21 | Ex. 22 | Ex. 23 | Ex. 24 |
|---|---|---|---|---|---|
| PC Ag-mixture II | wt % |  |  |  | 50 |
| final amount silver | wt % | 1 | 1.5 | 0.5 | 1.75 |
| final amount silica | wt % | 1 | 0.5 | 1.5 | 1 |

Results for Examples 21-24 are summarized in Table 6.

TABLE 6

| Example | Polymer | Solvent | Wt % of Metal Nanoparticles | Stabilizer and Loading | Particle Size (nm) |
|---|---|---|---|---|---|
| 21 | BPA/DMBPC | Water | 0.5 | Nanosilica 1.5 wt % | 50-100 |
| 22 | BPA/DMBPC | Water | 1 | Nanosilica 1.0 wt % | 50-100 |
| 23 | BPA/DMBPC | Water | 1.5 | Nanosilica 0.5 wt % | 50-100 |
| 24 | BPA/DMBPC | Water | 1.75 | Nanosilica 0.5 wt % | 50-100 |

In each of Examples 21-24, the decomposition temperature of the silver nitrate salt was 150° C. and the nanoparticles were silver (Ag(0)) having a spherical shape. The results show that the presence of silica does not interfere with the formation of silver nanoparticles during extrusion.

Examples 25-31

To make Examples 25-31, 40 wt % of a metal precursor was dissolved in 60 wt % of a solvent at 40° C. The solution was mixed with a polymer and dried to form a reaction mixture. The reaction mixture was then extruded in a twin-screw extruder to form a nanocomposite. The twin-screw extruder and the operating conditions are described above in Example 1.

Table 7 lists the polymer, metal precursor, and solvent used in each Example. ZnAc refers to zinc acetate, MeOH refers to methanol, and copper acac refers to copper acetylacetonate. Table 7 also contains a summary of Examples 25-31.

TABLE 7

| Example | Polymer | Solvent | Metal Precursor | Particle Size | Particle Oxidation State |
|---|---|---|---|---|---|
| 25 | BPA-PC | MeOH | ZnAc | 70-100 nm | ZnO |
| 26 | BPA-PC | MeOH | ZnNO$_3$ | 70-100 nm | ZnO |
| 27 | BPA-PC | DMF | Cobalt Carbonyl | 100 nm | Cobalt Oxide |
| 28 | PEI | DMSO | ZnAc | not tested | ZnO |
| 29 | PC/ABS | DMSO | Copper Acac | not tested | Copper Oxide |
| 30 | PC/ABS | MeOH | ZnAc | not tested | ZnO |
| 31 | ASA | DMF | Cobalt Carbonyl | 50-100 nm | Cobalt Oxide |

Examples 25 and 26 exhibited as decrease in $M_w$ as measured relative to the starting polymer M. It is possible that some of the byproducts adversely affected the Mw by cleaving the BPA-PC.

Figure 9:
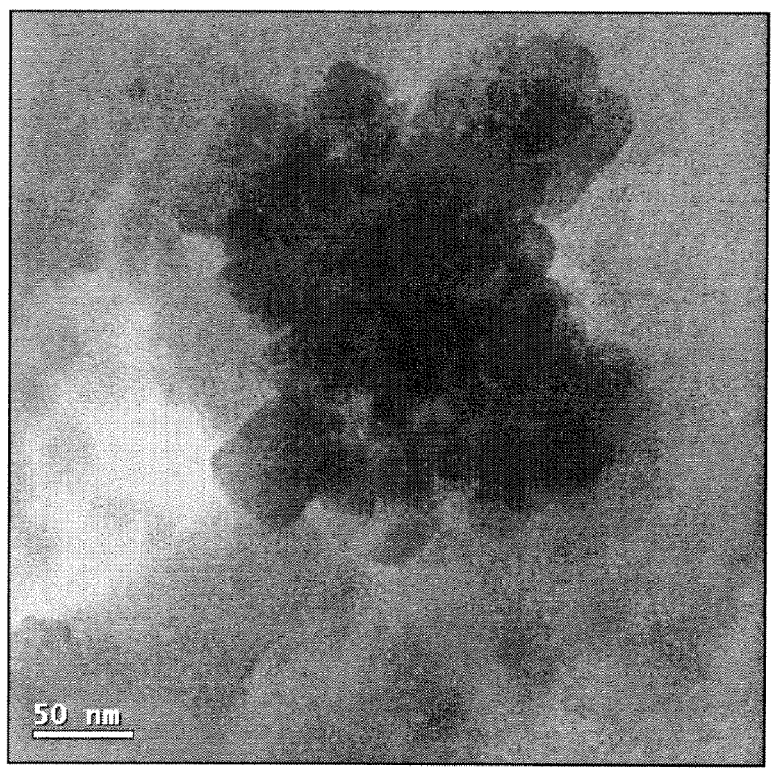
FIG. 9 is a TEM micrograph showing the morphology of a nanocomposite comprising cobalt oxide nanoparticles in a PC matrix.

FIG. 9 is a TEM micrograph of Example 27.

Figure 10:
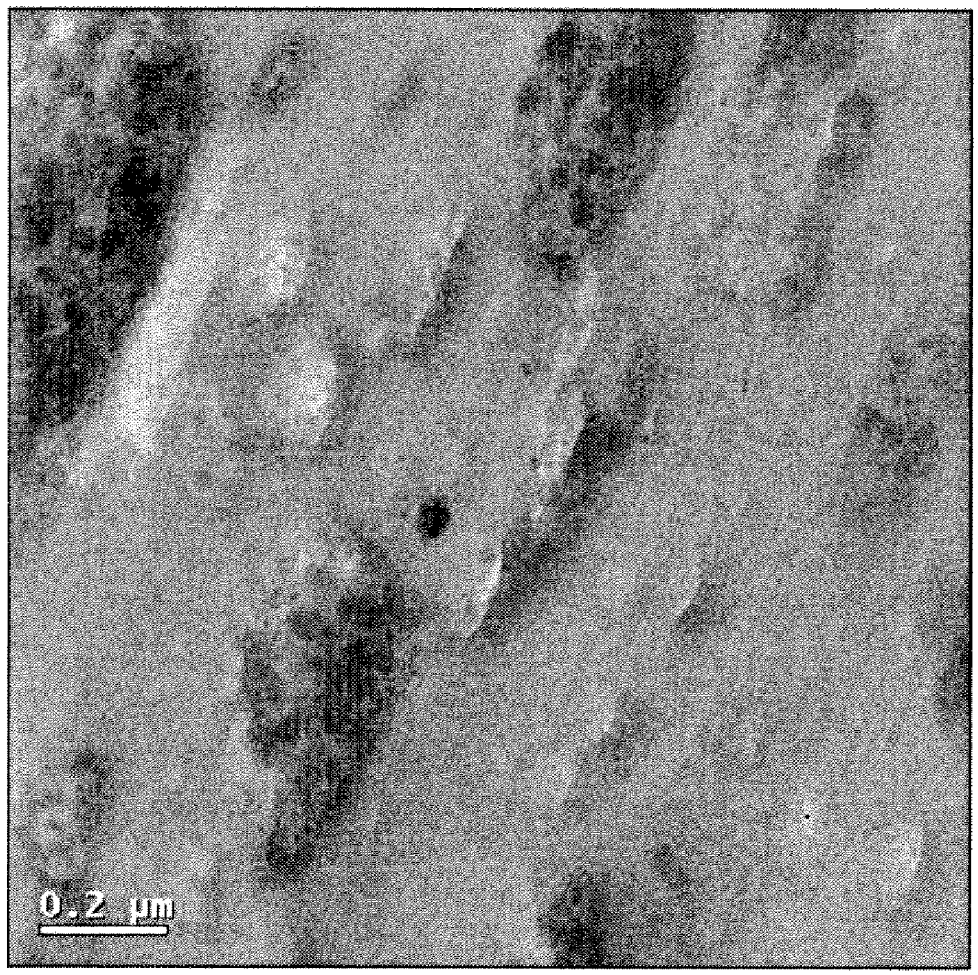
FIG. 10 is a TEM micrograph showing the morphology of a second exemplary embodiment of a nanocomposite comprising cobalt oxide nanoparticles in an ASA matrix.

FIG. 10 is a TEM micrograph of Example 31.

Examples 32-34

Three examples were tested for transmission and reflectivity according to

ISO9050:2003. The % T and % R were tested according to ASTM D1003.

Example 32 contained 0.5 wt % silver nanoparticles in a PC125 matrix.

Example 33 contained 1 wt % silver nanoparticles in a PC125 matrix.

Example 34 contained 1 wt % silver nanoparticles and 0.1 wt % diphenyl isodecyl phosphite (DPDP) in a PC125 matrix. PC125 is a BPA-PC homopolymer. DPDP was used to prevent surface oxidation of the nanoparticles, thereby increasing their % T and % R.

The three examples were tested at three different thicknesses: 15 microns, 50 microns, and 250 microns. The results are provided in Table 8 below. % R is the reflection. All units are in percentages.

TABLE 8

|  | Example 32 | Example 33 | Example 34 |
|---|---|---|---|
| wt % silver | 0.5 | 1 | 1 |
| film thickness | 15 μm | 15 μm | 15 μm |
| % T | 37.4 | 7.2 | 13.4 |
| % R | 17.2 | 26.2 | 27.2 |
| ΔR | 63.5 | 149.2 | 159.3 |
| film thickness | 50 μm | 50 μm | 50 μm |
| % T | 42.6 | 9.8 | 13.6 |
| % R | 16.4 | 24.8 | 28.7 |
| ΔR | 55.7 | 136.5 | 173.2 |
| film thickness | 250 μm | 250 μm | 250 μm |
| % T | 6.6 | 0.3 | 0.2 |
| % R | 17.6 | 25.0 | 27.3 |
| ΔR | 67.7 | 138.2 | 159.9 |

The % R is a measurement of the infra red (IR) reflectance property of a polymer)o For polycarbonate without any nanoparticles, the % R value is 10.5%. This relative change is important, and is noted in the ΔR row, which was calculated as the [(% R−10.5)/10.5]. Comparing Examples 32 and 33, as the amount of silver increased, the % R increased. Comparing Examples 33 and 34, for the same percentage of silver, the addition of DPDP increased the % R.

Limited testing of transmission and reflectivity was also performed for Examples 15-17 and 21-23. That data is provided in Tables 8A and 8B below.

TABLE 8A

|  | Example 16 | Example 15 | Example 17 |
|---|---|---|---|
| wt % silver | 0.5 | 1 | 2 |
| film thickness | 15 μm | 15 μm | 15 μm |
| % T | 15.1 | 2.7 | 0.3 |
| % R | 18.1 | 18.4 | 20.2 |
| ΔR | 72.7 | 75.3 | 92.0 |
| film thickness | 50 μm | 50 μm | 50 μm |
| % T | 17.2 | 2.0 | 0.2 |
| % R | 18.0 | 18.1 | 20.6 |
| ΔR | 71.8 | 72.8 | 96.4 |
| film thickness | 250 μm |  |  |
| % T | 0.8 |  |  |
| % R | 18.0 |  |  |
| ΔR | 71.8 |  |  |

TABLE 8B

|  | Example 21 | Example 22 | Example 23 |
|---|---|---|---|
| wt % silver | 0.5 | 1 | 1.5 |
| wt % silica | 1.5 | 1 | 0.5 |
| film thickness | 15 μm | 15 μm | 15 μm |
| % T | 21.6 | 5.7 | 2.6 |
| % R | 15.7 | 19.5 | 22.5 |
| ΔR | 49.6 | 85.3 | 114.0 |
| film thickness | 50 μm | 50 μm | 50 μm |
| % T | 21.4 | 3.5 | 1.6 |
| % R | 15.6 | 20.2 | 22.7 |
| ΔR | 48.1 | 92.0 | 116.3 |
| film thickness | 250 μm |  |  |
| % T | 4.6 |  |  |
| % R | 15.4 |  |  |
| ΔR | 46.2 |  |  |

Table 8A provided the same result: as the amount of silver increased, the % R increased.

Examples 35-36

In Examples 35 and 36, two exemplary nanocomposites were subjected to JIS Z 2801 antimicrobial testing to test their antimicrobial activity. *Escherichia coli* ATCC 8739 (*E. coli*) was prepared and diluted in a nutritive broth. The surface of the article was inoculated with the *E. coli* and then covered with a thin, sterile film. The surface of the article was then allowed to incubate undisturbed in a humid environment for 24 hours. After this incubation period, the concentration of *E. coli* at the surface of the article was measured and compared to a control.

The silver concentration in the nanocomposite was measured using XRF, with the calibration line based on ICP measurements. The particle size was determined using TEM. Transparency (% T) and haze were measured according to ASTM D1003. The results are summarized in Table 9 below.

TABLE 9

| Example | Silver Content (ppm) | Particle size (nm) | Antimicrobial efficiency (%) |
|---|---|---|---|
| Control | <3 | — | — |
| 33 | 94 | 50-100 | 60.78 |
| 34 | 568 | 50-100 | 76.45 |

The results showed that the addition of silver significantly decreased the amount of *E. coli* present on the surface of the article, as shown by an increase in the anti-microbial efficiency versus the control value.

The nanocomposites and methods of the present disclosure have been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method for producing a dispersion containing a polymer and nanoparticles, comprising:
   providing a solution comprising a metal precursor and a solvent, wherein the metal precursor is not in the form of nanoparticles;
   combining the solution with a polymer to form a mixture; and
   extruding the mixture to form the dispersion;
   wherein the extrusion step occurs at a melt temperature above the degradation temperature of the metal precursor and wherein the mixture has a residence time of at least 35 seconds;
   wherein the solution comprises from about 1 to about 30 wt % of the total weight of the polymer and the solution;
   wherein the dispersion contains metal nanoparticles, metal oxide nanoparticles, or a combination thereof;
   wherein the nanoparticles have an interparticle distance of from 0.1 nm to about 1500 nm in the dispersion; and
   wherein the nanoparticles comprise from about 0.125 to about 5 wt % of the total weight of the nanoparticles and the polymer.

2. The method of claim 1, wherein the dispersion further comprises a stabilizer to.

3. The method of claim 2, wherein the stabilizer is added to the mixture.

4. The method of claim 1, wherein the metal precursor is a metal salt.

5. The method of claim 1, wherein the solvent is water.

6. The method of claim 1, further comprising: providing an additive to the dispersion.

7. The method of claim 6, wherein the additive is added prior to, during, or after the extrusion of the dispersion.

8. The method of claim 6, wherein the additive is a stabilizer.

9. The method of claim 1, wherein the nanoparticles in the dispersion comprise from about 0.125 to about 2 wt % of the total weight of the nanoparticles and the polymer.

10. The method of claim 1, wherein the nanoparticles in the dispersion comprise about 0.125 wt %, about 0.25 wt %, about 0.5 wt %, about 1 wt %, or about 2 wt % of the total weight of the nanoparticles and the polymer.

11. The method of claim 1, wherein the metal precursor contains zinc or silver, wherein the extrusion step occurs at a melt temperature of at least 150° C., and wherein the nanoparticles in the dispersion comprise from about 0.125 to about 2 wt % of the total weight of the nanoparticles and the polymer.

12. The method of claim 1, wherein the extrusion step utilizes a twin screw extruder.

13. The method of claim 1, wherein the metal precursor contains zinc or silver.

14. The method of claim 1, wherein the metal precursor contains a Group 11 element, Group 12 element, or a transition metal.

15. A molded article comprising the dispersion produced by the method of claim 1.

16. The molded article of claim 15, wherein the dispersion contains silver and/or zinc.

17. An article of manufacture comprising the dispersion produced by the method of claim 1.

18. A method for producing a dispersion containing a polymer and nanoparticles, comprising:
   providing a solution comprising a metal precursor and a solvent, wherein the metal precursor is not in the form of nanoparticles;
   combining the solution with a polymer to form a mixture; and
   extruding the mixture at a melt temperature above the degradation temperature of the metal precursor and wherein the mixture has a residence time sufficient to form the dispersion;
   wherein the solution comprises from about 1 to about 30 wt % of the total weight of the polymer and the solution;

wherein the dispersion contains metal nanoparticles, metal oxide nanoparticles, or a combination thereof;

wherein the nanoparticles have an interparticle distance of from 0.1 nm to about 1500 nm in the dispersion; and wherein the nanoparticles comprise from about 0.125 to about 5 wt % of the total weight of the nanoparticles and the polymer.

* * * * *